United States Patent [19]

van Straaten

[11] 4,214,260
[45] Jul. 22, 1980

[54] CIRCUIT FOR THE LINE SYNCHRONIZATION IN A TELEVISION RECEIVER HAVING A GATED AUXILIARY CONTROL LOOP

[75] Inventor: Jan van Straaten, Nijmegen, Netherlands

[73] Assignee: U.S. Philips Corporation, New York, N.Y.

[21] Appl. No.: 946,971

[22] Filed: Sep. 28, 1978

Related U.S. Application Data

[63] Continuation of Ser. No. 727,714, Sep. 29, 1976, abandoned.

[30] Foreign Application Priority Data

Oct. 3, 1975 [NL] Netherlands ...................... 7511633

[51] Int. Cl.² .................... H04N 9/44; H04N 5/04
[52] U.S. Cl. ........................................ 358/17; 358/148
[58] Field of Search .................. 358/17, 148, 158, 159; 331/10, 11, 17, 18, 20; 360/36, 37

[56] References Cited

U.S. PATENT DOCUMENTS

| 3,863,080 | 1/1975 | Steckler ........................ 358/159 X |
| 3,904,823 | 9/1975 | van Straaten ...................... 358/148 |
| 3,969,760 | 7/1976 | Coffey .............................. 358/17 X |
| 3,991,270 | 11/1976 | van Straaten et al. ............ 358/158 |
| 4,015,287 | 3/1977 | Hovens ................................ 358/17 |
| 4,024,343 | 5/1977 | Cense et al. ........................ 358/148 |

*Primary Examiner*—Robert L. Griffin
*Assistant Examiner*—Aristotelis M. Psitos
*Attorney, Agent, or Firm*—Thomas A. Briody; William J. Streeter; Edward W. Goodman

[57] ABSTRACT

A line synchronization circuit in a television receiver in which gate pulses are derived from the oscillator signal for keying-out the synchronizing signal, in which the gate pulses are positioned by means of a phase-control loop symmetrically with respect to an edge of a reference signal which is also derived from the oscillator signal. Consequently the gate pulses may be very small which increases the noise immunity. The nominal voltage of the oscillator may be derived from the output of the control loop. The circuit also supplies a keying pulse for the color synchronization signal. Pulling-in can be accelerated in the case of narrow gate pulses by increasing the width thereof in case of non-coincidence of the gate and the line synchronizing pulses or by interrupting the supply thereof.

10 Claims, 3 Drawing Figures

CIRCUIT FOR THE LINE SYNCHRONIZATION IN A TELEVISION RECEIVER HAVING A GATED AUXILIARY CONTROL LOOP

This is a continuation of application Ser. No. 727,714, filed Sept. 29, 1976 now abandoned.

BACKGROUND OF THE INVENTION

The invention relates to a circuit for the line synchronisation in a television receiver, comprising a frequency and/or phase controllable oscillator, with means for supplying a pulse-shaped line synchronisation signal and a pulse-shaped gate signal derived from the oscillator signal to a coincidence stage, an output terminal of which is connected to a phase discriminator for determining the phase difference between the synchronising signal and a reference signal which is also derived from the oscillator signal, furthermore comprising a low-pass filter for smoothing the output voltage of the phase discriminator, the oscillator being controllable by the smoothed voltage thus obtained.

In such a circuit an input signal is supplied to the phase discriminator only during part of the period. As known, this causes an increase of the pull-in range of the circuit while noise and disturbances which may occur in the remaining part of the period have no detrimental influence. It will be clear that an improvement with respect to noise and disturbances is obtained accordingly as the gate pulses are of shorter duration. This especially applies to the pulse-shaped disturbing signals which are caused by reflection, for example from mountains or from high buldings, of the high-frequency television signal and which may occur shortly after the useful line synchronisation signal. If, however, the gate pulses are of a very short duration compared with the duration of the line period, then the pull-in range is no longer increased as compared with the case that the phase discriminator can receive a signal during the entire period.

SUMMARY OF THE INVENTION

It is an object of the invention to provide a circuit in which the gate pulses may have a shortest possible duration, so that the influence of noise and disturbances can be reduced to a minimum. To that end, the circuit according to the invention is characterized in that the circuit is also provided with an auxiliary control loop for having the central instant of a gate pulse and the central instant of an edge occurring in the reference signal occur substantially simultaneously, which loop comprises a second phase discriminator for determining the interval between said instants and a second low-pass filter for smoothing the output voltage of the second phase discriminator, said intervals being controllable by the smoothed voltage thus obtained.

Because of these measures it is ensured, in case the signal received comprises much noise and many disturbances, that the quantity thereof at the output terminal of the discriminator, before the central instant of a gate pulse, is equal to the quantity thereof after this instant, so that the frequency of the oscillator is not affected after all. For gate pulses of a longer duration, any asymmetry of the edge of the reference signal with respect to the gate pulse results in a slight phase error of the oscillator signal. It will be clear that the measure according to the invention may also be used in this case, so that this phase error does not occur while the pull-in properties are improved with respect to the case in which gate pulses are of a minimum duration.

Because the oscillator can be controlled by a voltage, the circuit according to the invention may have the characteristic that at least part of the voltage supplied to the oscillator is derived from the second smoothed voltage. This provides a further increase in the noise immunity.

If it is desired to maintain the improved pull-in properties of the circuit by means of longer-duration gate pulses while the noise immunity is large, then the circuit according to the invention may have the characteristic that the duration of the gate pulses only slightly exceeds the duration of the line synchronizing pulses and may be characterized by a coincidence detector for determining the simultaneous occurrence of the gate pulses and the line synchronizing pulses. The gate pulses in the case of noncoincidence are switchable to a longer duration by the action of the coincidence detector, or by a coincidence detector for determining the simultaneous occurrence of the gate pulses, and the line synchronizing pulses and by a switch included in the supply lead from the gate pulses to the coincidence stage. The switch is non-conducting in the case of non-coincidence owing to the action of the coincidence detector. The time constant of the first lowpass filter in the case of non-coincidence is switchable to a smaller value, and the sensitivity of the first phase discriminator is switchable by the action of the coincidence detector.

DESCRIPTION OF THE DRAWINGS

The invention will be further explained with reference to the accompanying figures, given by way of example in which.

DESCRIPTION OF THE PREFERRED EMBODIMENT

Figure 1:
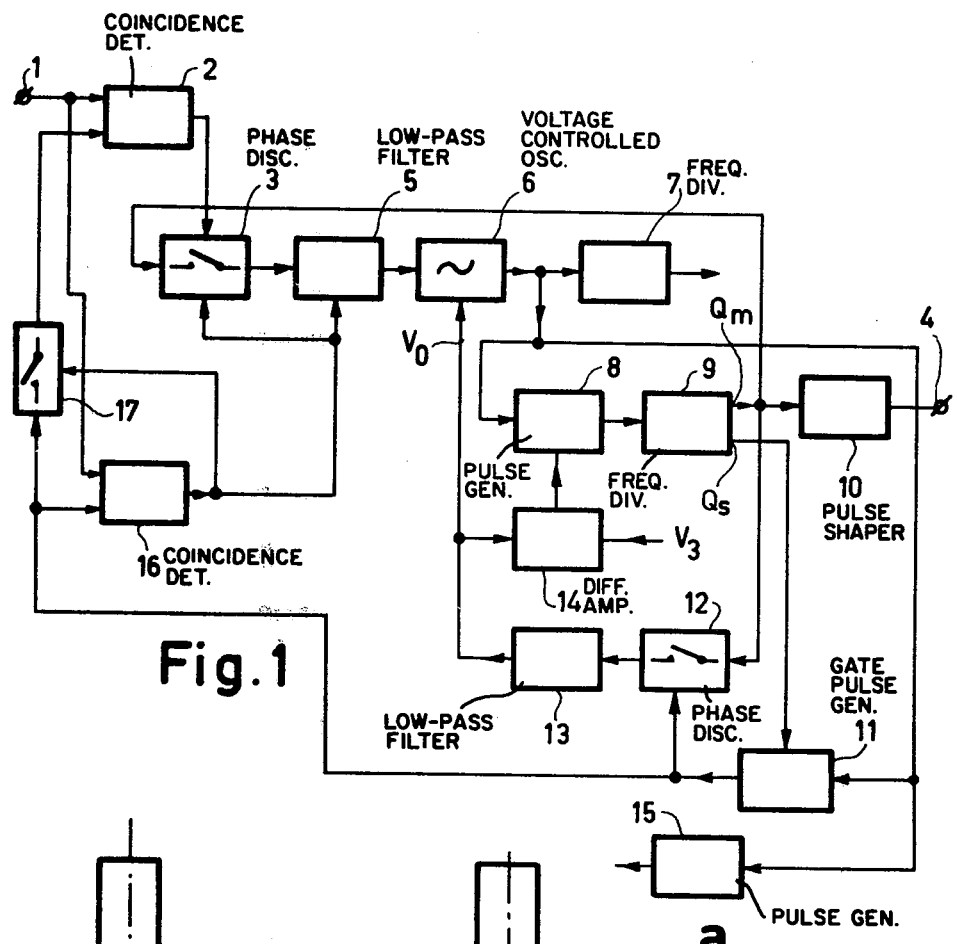
FIG. 1 shows a block diagram of a construction of the circuit according to the invention and FIGS. 2 and 3 show waveforms occurring therein.

In FIG. 1 reference 1 indicates the input terminal of the circuit according to the invention. Line synchronizing pulses of the line repetition frequency $f_H$, i.e. for example, 15625 or 15750 Hz are present at this terminal. In known manner they are derived in the television receiver, not shown further in the drawing, and of which the circuit is a part of a synchronizing-separating stage, from the signal received and supplied to a coincidence stage 2. FIG. 2a shows the variation of these pulses versus the time. Herein the symbol $T_H$ indicates the line period, i.e. approximately 64 μs.

Figure 2:
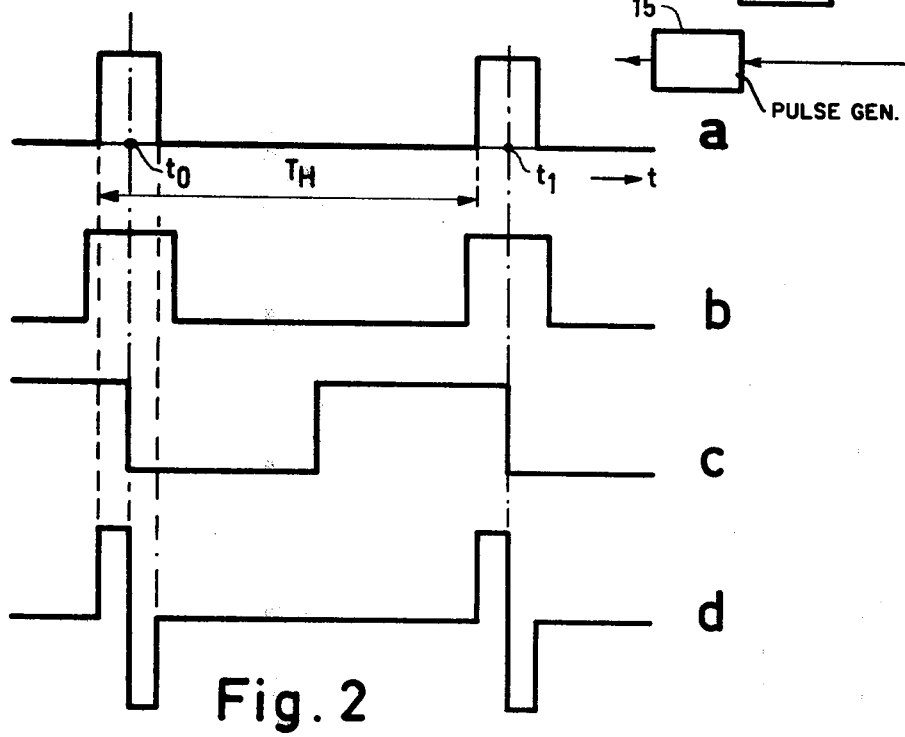

FIG. 2b shows the variation of gate pulses which are also supplied to coincidence stage 2, in the absence of switch 17, and which are produced in the circuit in a manner which will be explained hereinafter. In FIG. 2b each gate pulse is drawn symmetrically with respect to the central instant $t_o$ of the corresponding line synchronizing pulse of FIG. 2a. As known, this pulse has a duration of, for example 4.5 to 5 μs. A slightly longer duration, for example 5.5 to 6 μs is chosen for the gate pulses. The output signal of stage 2 is supplied to a controllable switch 3. If the pulses at the inputs of stage 2 occur, as in FIG. 2, at least partly simultaneously, then switch 3 is made conductive for the duration of that part of the line synchronizing pulses.

The signal present at the output terminal 4 of the circuit, or a signal derived therefrom, can be supplied to switch 3, although in FIG. 1 the output of box 9 is used as explained below. The input signal of switch 3 is shown in FIG. 2c and is of the line frequency. In the synchronized state it shows a falling edge at instant $t_o$ and a rising edge at an instant, which, for example, is in the center of the time interval between instant $t_o$ and the corresponding instant $t_1$ one period later.

In these circumstances the voltage shown in FIG. 2d is present at the output terminal of switch 3. After smoothing by means of a low-pass filter 5, a D.C. voltage is produced. In the case shown in FIG. 2d, the pulse area above the zero axis, is equal to that below the zero axis so that the D.C. voltage obtained is zero. However, the zero axis in FIG. 2d is not actually zero, but corresponds to the mean value of the voltage of FIG. 2c, so that in fact the voltage obtained is not zero, but the difference between zero and said mean value. In the case that the edge of the reference voltage of FIG. 2c is not produced at instant $t_o$, the areas considered are not equal to one another and the integration times of filter 5 are not equal either. Consequently, the D.C. voltage obtained is not zero. It is supplied to a voltage-controlled oscillator 6 whose frequency and/or phase is consequently readjusted. It appears from the foregoing that switch 3 behaves as a phase discrimrinator. If the frequency of the signal of FIG. 2c deviates from the value $f_H$ then the phase difference between this signal and that of FIG. 2a varies continuously. Then the control voltage supplied to oscillator 6 is an A.C. voltage until both frequencies are equal whereafter the control voltage is a D.C. voltage.

A D.C. voltage $V_o$, of, for example, 3 V on which the control voltage mentioned above is superimposed is also supplied to oscillator 6. Voltage $V_o$ may correspond to the nominal frequency of the line synchronizing pulses in accordance with the television standard for which the television receiver is suitable. In the construction described the signal produced by oscillator 6 has, however, in the nominal case wherein the control voltage is zero, a frequency $2f_H$ which is double the line frequency. This signal is supplied to a frequency divider 7 in which the frequency is divided by the number of lines per picture in the relevant standard, which is, for example, 625 or 525. At an output terminal of divider 7, in the synchronized state of the line control loop a signal of field frequency of, for example, 50 or 60 Hz, is available which may be supplied to a field synchronization circuit of a known type.

A sawtooth signal shown in FIG. 3a is derived from the signal of oscillator 6 and is supplied to a pulse generator 8. Herein the sawtooth is changed into a pulse shape (FIG. 3b) by means of a clipping level $V_1$. The leading edges of the pulses and the rising edges in FIG. 3a occur simultaneously, while the instant the trailing edges of the pulses occur is determined by the value of voltage $V_1$. These pulses are supplied to a frequency divider 9 which, for example, is a binary divider of a known type, for example a master-slave flip-flop. The output signals thereof have the line frequency $f_H$, the signal at an output terminal $Q_s$ (see FIG. 3c) changing to another level each time a rising edge occurs in that of FIG. 3b, while the signal at an output terminal $Q_m$ (see FIG. 3d) changes to another level each time a falling edge occurs in that of FIG. 3b. This implies that the leading and trailing edges of the signal of FIG. 3c are fixed with respect to the time axis, while the leading and trailing edges of the signal of FIG. 3b depend on the value of voltage $V_1$.

The signal at terminal $Q_m$ is supplied as reference voltage to switch 3 as well as to a pulse shaper 10 whose output signal is available at the output terminal 4 of the circuit. The variation of this signal is suitable for supply to an output stage, not shown, which stage supplies a current of line frequency to the deflection coil for horizontal deflection in the picture display tube. Alternatively, it may be supplied to a phase discriminator in which it is compared with a signal derived from the line output stage. In this known manner the influence of variations in the load, for example the beam current in the picture display tube can be compensated.

The sawtooth voltage of FIG. 3a is also supplied to a gate pulse generator 11 in which the sawtooth is changed into a pulse shape by means of a clipping level $V_2$. The rising edges thereof occur simultaneously with those of FIG. 3a, while the falling edges occur at the instants at which the sawtooth reaches the value $V_2$. In this manner the frequency of these pulses would normally have double the line frequency. However, the signal at the terminal $Q_s$ of divider 9 is also supplied to generator 11 in such a manner that each trailing edge of this signal renders generator 11 non-conductive. In this way generator 11 produces the gate pulses of FIG. 3e, which are also shown in FIG. 2b, which have a frequency equal to the line frequency, and which are supplied to coincidence stage 2 in the absence of switch 17.

Since the gate pulses have only a slightly longer duration than the synchronizing pulses of FIG. 2a, the sensitivity of the circuit to noise and disturbances is small, which especially applies to disturbances caused by reflection. If the signal received is very weak and consequently contains much noise, the signal of FIG. 2d then mainly consists of noise. However, in the synchronized state in this case, the areas above and below the zero axis are equal so that the oscillator remains stable. A condition is that the pulses of FIG. 2b are symmetrical with respect to the trailing edges of FIG. 2c. It is true that both signals are derived from the same source, but a slight shift may occur which is caused by spreads in the properties of the various components, in inequalities of the transition times in the various transistors, etc. With a gate pulse of a longer duration this shift may be tolerated in certain circumstances, but it will be clear that it is absolutely impermissible in the present case. For, at a pulse duration of 5.5 μs a shift of 0.5 μs means already a deviation of 9%.

The signal at the output terminal $Q_m$ of divider 9 (FIG. 3d), which signal is given a substantially constant amplitude of $2V_3$, and the gate pulses derived from generator 11, are supplied to a phase discriminator 12 which is constructed as a controllable switch. During the occurrence of the gate pulses switch 12 conducts and its output voltage (see FIG. 3f) is smoothed by a lowpass filter 13. As the two input signals of switch 12 invariably, including the non-synchronized state of oscillator 6, have the same frequency, the output voltage of filter 13 cannot contain a component having a beat frequency. The only A.C. voltage present is a ripple voltage of line frequency. Consequently, the time constant of filter 13 may be small. The output voltage thereof, as well as a direct voltage $V_3$, which is equal to half the amplitude of the voltage of FIG. 3b, and which is derived from the supply voltage of the circuit, are supplied to a difference amplifier 14 of a known type. If these voltages differ from one another, then amplifier 14 produces a voltage $\Delta V$ which is added to level $V_1$ (see FIG. 3a). This causes the duration of the pulses in FIG.

3b to change and consequently also the position of the reference signal. appears from FIG. 3a, 3b, 3d and 3f that in the case, indicated by dashed lines, the voltage ΔV is positive, the reference signal occurs earlier than if voltage ΔV is zero, and that the edge in the center of the output voltage of switch 12 also occurs earlier. If, on the other hand voltage ΔV is negative, then said edge occurs later. If voltage ΔV is zero, then said output voltage is symmetrical with respect to the central edge thereof and the smoothed voltage is equal to $V_3$. If the voltage ΔV is not zero, then the areas above and below the $V_3$ level in FIG. 3f are not equal to one another, so that said voltage is not equal to $V_3$ because the time intervals in which integration is effected by means of filter 13 are not equal to one another. Elements 8 to 14 thus constitute an auxiliary control loop whose action is such that ΔV finally becomes zero. If this situation has been attained then each gate pulse is symmetrical with respect to the edge of the reference signal.

It will be noted that the final state of the auxiliary control loop is attained after a period of time which is independent of the frequency of oscillator 6. This time may be short if a small value is chosen for the time constant of filter 13. There is no objection to this value being large, for example with the aim to still better eliminate noise and disturbances. Furthermore, said final state is attained after the oscillator has started oscillating after switch-on of the television receiver. On switching-over to another transmitter, the oscillator moves from the synchronisation state and must again be pulled-in, but the final state of the auxiliary control loop in which the gate pulses and the reference signal are symmetrical with respect to one another is maintained. The auxiliary control loop cannot be adversely affected by noise and disturbances. So the time constant may be chosen at will.

Figure 3:
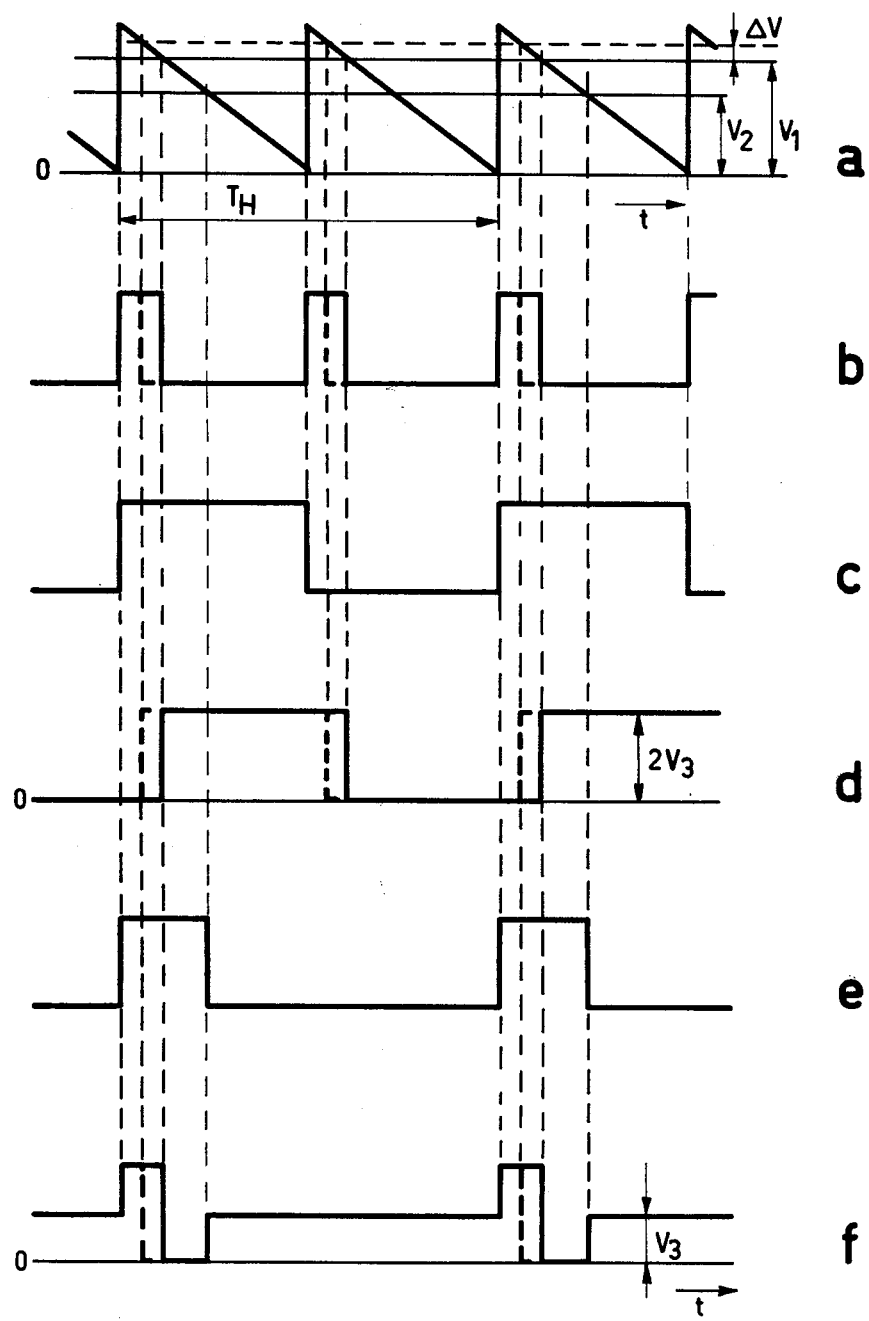

In the foregoing the idealised waveforms of FIGS. 2 and 3 have been discussed. It will be clear that both the leading and the trailing edges in, for example, FIG. 2b and the edges in, for example, FIG. 2c show in practice no infinitely steep slopes but a kind of sawtooth. Consequently, the above-mentioned symmetry implies that the central instance of the pulses in FIG. 2b and of the edges in FIG. 2c occur substantially simultaneously, in which by central instant in the first-mentioned case the instant is meant which is in the center of the time interval between which the signal is higher than half its maximum value, and in the second case the instant at which half the maximum value is attained.

In the circuit described the position of the reference signal varies along the time axis during pulling-in of the auxiliary control loop, while that of the gate pulses remains the same. It will be clear that a construction can be realized in which the position of the gate pulses varies, while that of the reference signal is not affected by the control.

A disadvantage of the known measure described, in which a D.C. voltage $V_o$ is supplied to oscillator 6 and in which the latter produces, in the absence of control voltage, a signal having the normal frequency (or a multiple thereof), is that this voltage is derived from the supply voltage, for example by means of two resistors forming a voltage divider. Consequently, the voltage $V_o$ is subjected to spreads due to tolerances, for example of resistors. Because the supply voltage is as a rule obtained by rectifying the voltage from the electric mains supply, voltage $V_o$ furthermore contains ripple components of a low frequency and other disturbances which have, for example, been caused by radiation. However, one aspect of the invention is based on the recognition that in the circuit of FIG. 1, voltage $V_o$ is derived from the output voltage of filter 13 or is equal thereto. In the latter case, as shown in FIG. 1, filter 13 is connected directly to oscillator 6. In the stationary state said output voltage is in principle equal to the D.C. voltage $V_3$ supplied to difference amplifier 14. It is true that this voltage itself is derived from the supply voltage and, consequently, not constant, but the output voltage of filter 13 is substantially constant and does substantially not contain disturbances. This is caused by the fact that the time constant can be chosen at will, as well as by the fact that the auxiliary control loop 8 to 14 inclusive behaves as a low-pass filter. Owing to this measure, to have the nominal frequency of the oscillator be determined by the auxiliary control loop, the detrimental influence of noise and disturbances is still further reduced.

In the synchronized state the edges of the signals of FIG. 2 occur at fixed time differences relative to one another. Consequently, a pulse can be derived from one of these signals with a fairly large accuracy for keying out the color synchronizing signal which pulse may also be used for stabilizing the black level. The sawtooth voltage of FIG. 3a derived from oscillator 6 is, for example, supplied to a pulse generator 15, in which a pulse is produced by means of a clipping level. The trailing edge thereof occurs at a suitable instant, while the leading edge thereof occurs simultaneously with the trailing edge of the pulse of FIG. 2b, and consequently before the occurrence of the color synchronizing signal.

Because the gate pulses are of such a short duration, the noise immunity of the circuit is particularly large, which is, however, to the detriment of the pull-in properties. An improvement in this respect may be obtained by a switch-over in which the gate pulses are of a longer duration for the time the synchronization state of the oscillator has not yet been attained. This is ensured by a coincidence detector 16 to an input terminal of which the incoming line synchronization pulses are supplied, while the gate pulses of generator 11 are supplied to a second input terminal. If the pulses supplied do not occur simultaneously, then detector 16 supplies a D.C. voltage which operates a switch, which causes a level $V_2$ in FIG. 3a to assume a lower value. This results in a pulse of a longer duration in FIG. 3e FIG. 1 shows another construction. A switch 17 is included in the lead between gate pulse generator 11 and coincidence stage 2. If detector 16 detects the non-synchronized state then the resulting D.C. output causes the switch 17 not to conduct. Consequently, no gate pulse is supplied to stage 2, which continuously conducts. The synchronizing pulses at terminal 1 are passed on to phase discriminator 3. The pull-in procedure is accelerated because the voltage supplied by detector 16 is also supplied to phase discriminator 3 to increase its sensitivity and to filter 5 for reducing its time constant. Consequently, the control loop gets a greater loop gain. In practice this may be realised as follows. Filter 5 comprises a resistor in series with switch 3 which has the function of phase discriminator, and a capacitor which is charged by the current flowing through the resistor. Additional RC-networks may in known way be applied parallel with the capacitor. If, by the action of detector 16 the series resistance in filter 5 assumes a lower value, then the time constant of the filter is reduced, while the charging current of the capacitor, and consequently the output voltage of the phase discriminator, is increased. Consequently, the sensitivity thereof is also increased. A similar measure may also be used in the above-mentioned case where the duration of the gate pulses is increased.

In these circumstances the control loop pulls-in rather quickly, in spite of the fact that noise and disturbances have not been keyed out. As soon as the synchronisation state has been attained, the input signals of coincidence detector 16 occur simultaneously, so that the detector 16 no longer supplies a voltage. Switch 17 conducts so that the gate pulses reach coincidence stage 2, while the loop gain assumes its lower value. In this situation the control loop is considerably more immune to noise, while oscillator 6 need only be readjusted slightly. It will be noted that the auxiliary control loop is not affected by the switch-over described. Consequently the reference signal is not subjected to a transient. Dutch Pat. Application No. 7,409,514 discloses a coincidence detector which may be used as the detector 16 of FIG. 1.

The circuit of FIG. 1, with the exception of capacitors which are part of filters 5 and 13, may be advantageously integrated in a semiconductor body. Because the nominal voltage $V_o$ for oscillator 6 is not derived from the supply voltage, an external connection can be dispensed with. It is replaced by a new connection, namely that for the output terminal of filter 13, so that the number of connections remains unchanged.

In the foregoing, the oscillator is in the nominal state of double the line frequency. It will be clear that this is not essential for the invention, i.e. the invention can also be used if the nominal frequency is the line frequency.

What is claimed is:

1. A line synchronizing circuit comprising an oscillator having a reference signal input, a control input means for controlling at least one of the parameters of frequency and phase of said oscillator, and an output; a coincidence stage having first input means for receiving a pulse shaped line synchronization signal, second input means for receiving gate pulses derived from said oscillator output, and an output, a first phase discriminator having a first input means coupled to said stage output, a second input means for receiving a pulsatory reference signal derived from said oscillator output, and an output means for providing a signal indicative of the phase difference between the signals at said discriminator input means; a first low pass filter having an input coupled to said discriminator output means and an output means coupled to said oscillator control input means for providing a smoothed discriminator output voltage thereto; and an auxiliary control loop means for providing that the central instant of a signal pulse substantially coincides with the central instant of an edge occurring in said reference signal, said loop including a second phase discriminator having two inputs coupled to receive said gate pulses and said reference signal derived from said oscillator output respectively, and an output means for providing a signal in accordance with a possible interval between said instants; and a second low pass filter having an input coupled to said second discriminator output means and an output means coupled to said oscillator reference signal input for applying a smoothed voltage thereto; whereby said interval is reduced to substantially zero.

2. A circuit as claimed in claim 1, said loop further including a pulse generator means coupled to said oscillator output for deriving pulses from the oscillator signal, and a difference amplifier means coupled to said second low pass filter output and said pulse generator for amplifying the difference between the second recited smoothed voltage and a reference voltage, the time position of an edge of the derived pulse being controllable in dependence on the output signal of the difference amplifier.

3. A circuit as claimed in claim 1, wherein the time position of the gate pulses is not affectable by the auxiliary control loop.

4. A circuit as claimed in claim 1, wherein at least part of the voltage supplied to the oscillator is derived from the second smoothed voltage.

5. A circuit as claimed in claim 1, further comprising a generator means coupled to said oscillator for producing a keying pulse for the colour synchronization signal, an edge of the keying pulse produced and an edge of the gate pulse occurring simultaneously.

6. A circuit as claimed in claim 1, wherein the duration of the gate pulses only slightly exceeds the duration of the line synchronizing pulses.

7. A circuit as claimed in claim 6, further comprising a coincidence detector means for determining the simultaneous occurrence of the gate pulses and the line synchronizing pulses, the gate pulses in the case of non-coincidence being switchable to a longer duration by the action of the coincidence detector.

8. A circuit as claimed in claim 6, further comprising a coincidence detector means for determining the simultaneous occurrence of the gate pulses and the line synchronizing pulses, and a switch coupled in series with the coincidence stage second input means having a control input coupled to a coincidence detector means output, the switch in case of non-coincidence being non-conducting owing to the action of the coincidence detector.

9. A circuit as claimed in claim 8, wherein the time constant of the first low-pass filter in the case of non-coincidence is switchable to a smaller value and the sensitivity of the first phase discriminator is switchable by the action of the coincidence detector.

10. A circuit as claimed in claim 7, wherein the time constant of the first low pass filter in the case of non-coincidence is switchable to a smaller value and the sensitivity of the first phase discriminator is switchable by the action of the coincidence detector.

* * * * *